(12) United States Patent
LeBlanc et al.

(10) Patent No.: US 8,204,485 B2
(45) Date of Patent: Jun. 19, 2012

(54) SYSTEM AND METHOD FOR ENABLING A MOBILE CONTENT PLAYER TO INTERFACE WITH MULTIPLE CONTENT SERVERS

(75) Inventors: Michael LeBlanc, Fredericton (CA);
Jody Glidden, Sterling, VA (US); Ian Brian DeLong, Fredericton (CA);
Steven Douglass, Fredericton (CA);
Martyn Edward Sibbald, Fredericton (CA); Jacob Samuel O'Reilly, Fredericton (CA); David James Hudson, Fredericton (CA)

(73) Assignee: Research In Motion Limited, Waterloo, Ontario (CA)

( * ) Notice: Subject to any disclaimer, the term of this patent is extended or adjusted under 35 U.S.C. 154(b) by 369 days.

(21) Appl. No.: 12/435,101

(22) Filed: May 4, 2009

(65) Prior Publication Data

US 2009/0280792 A1    Nov. 12, 2009

Related U.S. Application Data

(60) Provisional application No. 61/051,058, filed on May 7, 2008.

(51) Int. Cl.
*H04M 1/725* (2006.01)
*G06F 9/44* (2006.01)

(52) U.S. Cl. .................................... 455/412.2; 717/171

(58) Field of Classification Search ............... 455/418, 455/412.2, 414.1, 466; 709/203, 220, 223, 709/201, 202, 227, 228, 229; 717/168, 170, 717/172, 173, 174, 177, 178
See application file for complete search history.

(56) References Cited

U.S. PATENT DOCUMENTS

| | | | |
|---|---|---|---|
| 7,596,610 B2 * | 9/2009 | Faisal et al. | 709/220 |
| 2004/0181604 A1 | 9/2004 | Immonen | |
| 2005/0083929 A1 | 4/2005 | Salo et al. | |
| 2007/0260674 A1 * | 11/2007 | Shenfield | 709/203 |
| 2008/0062940 A1 | 3/2008 | Othmer et al. | |
| 2008/0229304 A1 * | 9/2008 | Bengtsson et al. | 717/178 |

* cited by examiner

*Primary Examiner* — George Eng
*Assistant Examiner* — Hung Du
(74) *Attorney, Agent, or Firm* — Norton Rose Canada LLP

(57) ABSTRACT

A system and method is provided for a wireless device for adding a content server as a content source for the wireless device in a push content delivery system having a plurality of content servers configurable for delivering push content to the wireless device. The process operable on the wireless device comprises receiving an invitation from the content server at the wireless device; determining if a mobile content player is to be installed on the wireless device; determining if the invitation is accepted; sending wireless device data to the content server from the wireless device if the invitation is accepted, where the wireless device data is for configuring the content server to push content to the wireless device; and retrieving and installing the mobile content player on the wireless device if the mobile content server is to be installed.

15 Claims, 7 Drawing Sheets

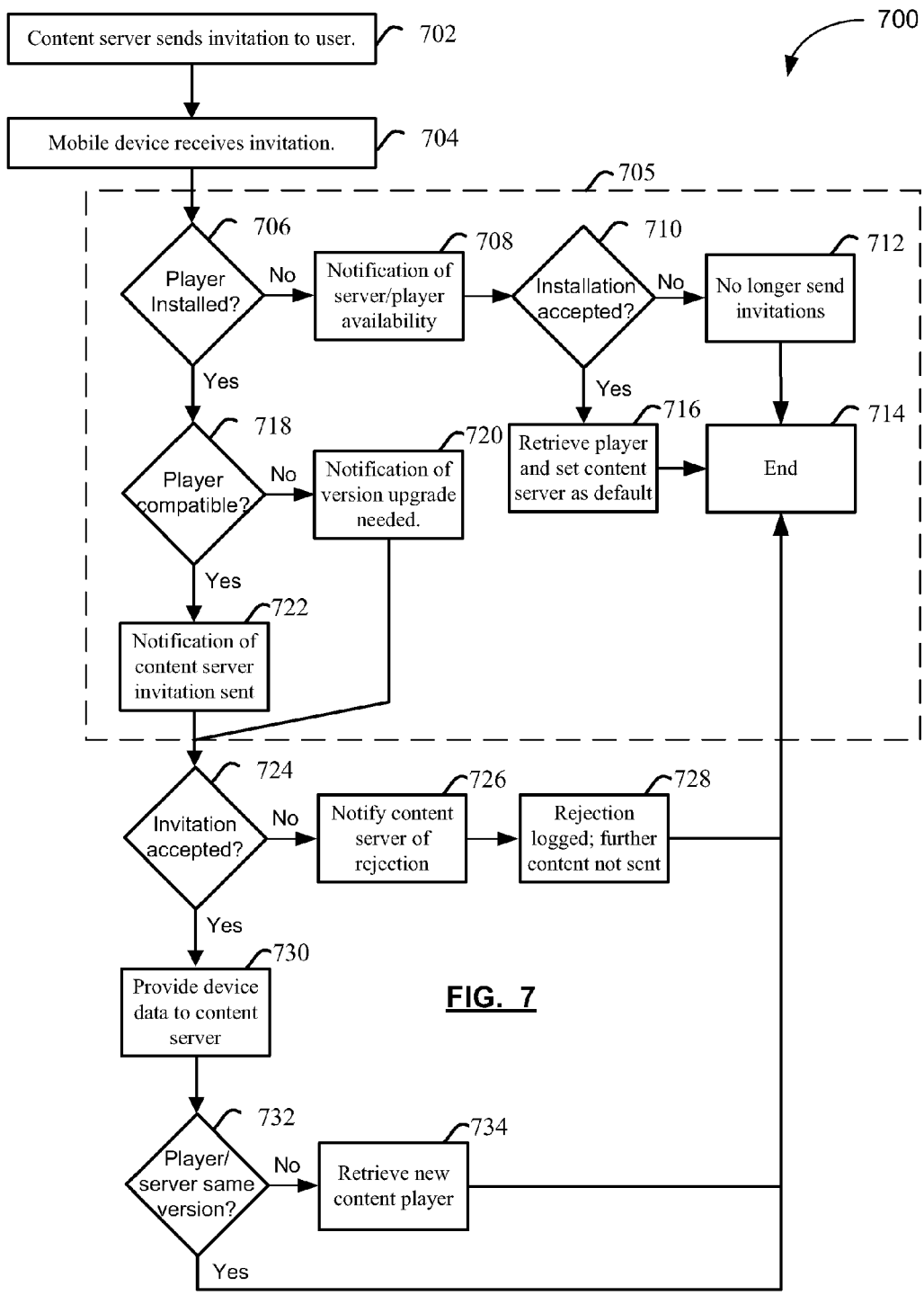

SYSTEM AND METHOD FOR ENABLING A MOBILE CONTENT PLAYER TO INTERFACE WITH MULTIPLE CONTENT SERVERS

CROSS REFERENCE TO RELATED APPLICATIONS

The present application claims priority to U.S. Provisional Application No. 61/051,058 filed May 7, 2008, the entirety of which is hereby incorporated by reference.

TECHNICAL FIELD

The present disclosure relates generally to portable devices, and more particularly to a system and method for enabling a mobile content player to interface with multiple content servers.

BACKGROUND

Currently, mobile content players for receiving and playing push content are associated with a single content server and will receive content from that server only. This current model for mobile content providers or publishers is limited. If the content provider or publisher relies on a web site other than the content server, then the user must navigate to that web site to select content and manually retrieve the content. If the content provider or publisher relies on email to communicate the content availability to the user, the user must still navigate to the content, such as by travelling to an embedded URL, and retrieve the content. If the content provider or publisher provides an RSS feed for the user, this still requires the user to select the content and retrieve it at that time. The conventional approaches to viewing push content have several restrictions including: (a) The user is limited to only the content available from the initial host on the mobile content player and no other; and (b) Many content management systems can assign content access to a user or make it available anonymously, but then require the user to retrieve the content from the content server. In order for a user to retrieve a webpage, for example, the user has to find the webpage and pull the content down, in a manner similar to RSS feeds where the user initiates the selection and pulls the content. The RSS feeds update the topic list but the user has to pull the actual content.

With existing systems, content providers cannot direct content but the providers can send an email with an embedded link and require user to pull the content; or the providers can make RSS feeds or web sites available that the user can search for. With these approaches, the user does not always know whether the content is new. With conventional approaches, it is the client or the client's mobile device that must poll the server to check for new content. With conventional approaches, the communication is unidirectional with no feedback provided when the user pulls down content. These conventional approaches use anonymous access and no tracking can be performed to track which user looked at which materials. The only current method for tracking content consumption through email involves read receipts and this only tells the content provider that the user has accessed the email. The conventional methods waste processing and battery resources on the wireless device while the user must take additional steps to retrieve the content using a pull mechanism, and also waste the user's time.

It would be desirable to have a method for delivering push content to mobile devices that addresses at least one of the above-noted concerns.

BRIEF DESCRIPTION OF THE DRAWINGS

Reference will now be made to the drawings, which show by way of example, embodiments of the present disclosure, and in which:

FIG. 7 shows in flowchart form the invitation interaction of FIG. 6 in greater detail.

It will be noted that throughout the appended drawings, like features are identified by like reference numerals.

DETAILED DESCRIPTION

Figure 1:
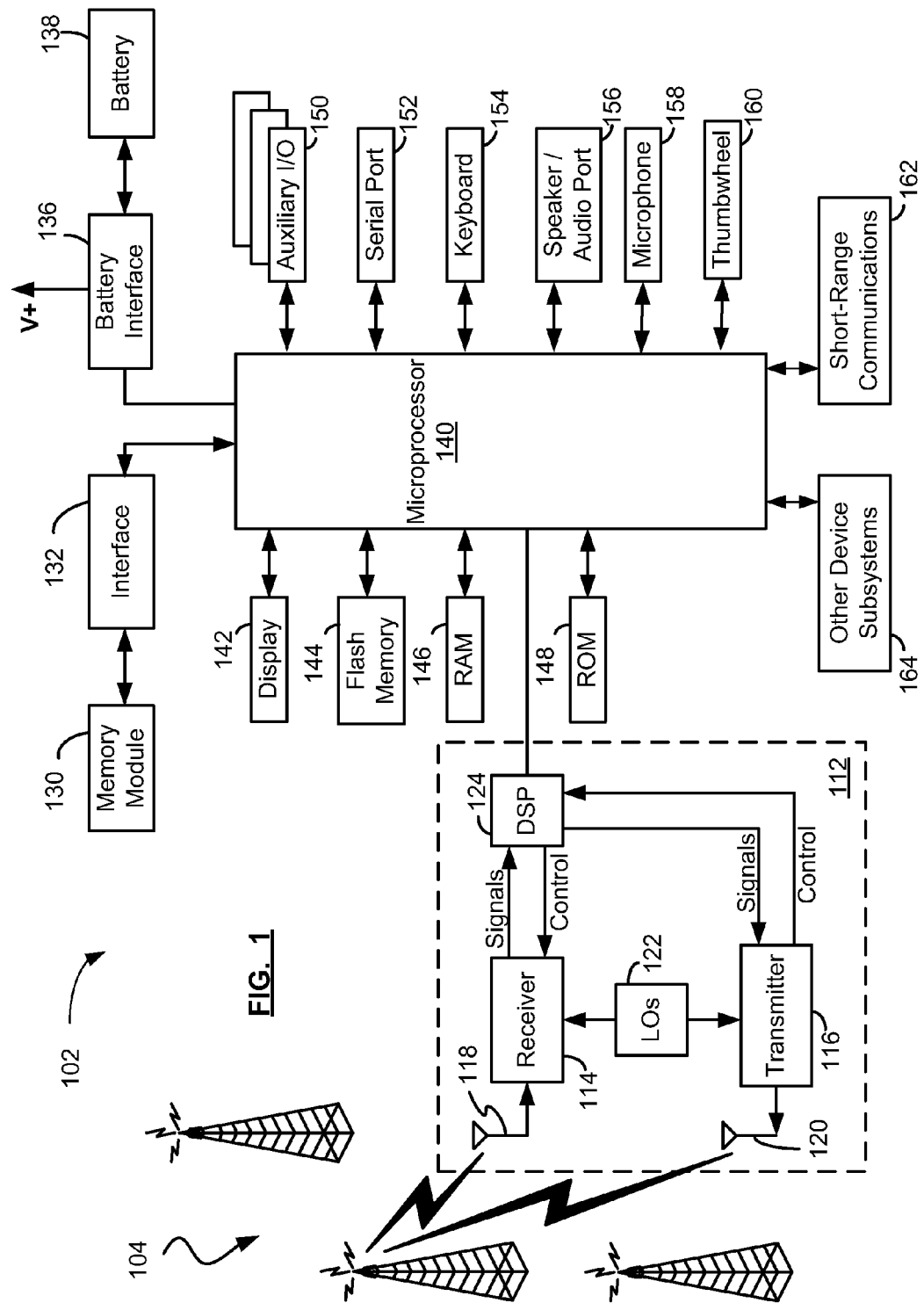
FIG. 1 shows in block diagram form a wireless device suitable for having a mobile content player in accordance with one embodiment.

One aspect of the present description includes a wireless device comprising a processor for controlling operation of the wireless device; a first input device coupled to the processor for accepting an input; at least one display device coupled to the processor for communicating an output to the user; a communications subsystem coupled to the processor for communicating with a communications network, the communications network including a plurality of content servers configurable for delivering push content to the wireless device; a memory coupled to the processor; and a storage device coupled to the processor. The wireless device includes one or more modules for adding one of the plurality of content servers as a content source for the wireless device in a push content delivery system. The one or more modules may be configured to cause the wireless device to: receive an invitation from one of the plurality of content servers; determine if a mobile content player is to be installed in the storage device; determine if the invitation is accepted; send data to the content server if the invitation is accepted, the data for configuring the content server to push content to the wireless device; and retrieve and install the mobile content player in the storage device if the mobile content server is to be installed.

Another aspect of the description provides a method in a wireless device for adding a content server as a content source for the wireless device in a push content delivery system having a plurality of content servers configurable for delivering push content to the wireless device. The method comprises receiving an invitation from the content server at the wireless device; determining if a mobile content player is to be installed on the wireless device; determining if the invitation is accepted; sending wireless device data to the content server from the wireless device if the invitation is accepted, the wireless device data for configuring the content server to push content to the wireless device; and retrieving and installing the mobile content player on the wireless device if the mobile content server is to be installed.

Another aspect of the description provides a push content delivery system for delivering push content to a wireless device. The system comprises a plurality of content servers each configurable to deliver push content to the wireless device, each of the content servers having a processor connected to a memory; and a plurality of mobile connectors each coupled to one or more of the respective content servers for delivering the push content to the wireless device. Each of the plurality of content servers has one or more modules stored in the memory. The modules are configured to cause the content server to send an invitation to the wireless device to receive push content from the content server, the invitation including information relating to the push content being offered to the wireless device and a version of a mobile content player needed for viewing the push content.

Reference is first made to FIG. 1, which shows a block diagram illustrating a portable wireless device 102 that is suitable for having a mobile content player in accordance with one aspect of the present disclosure. The wireless device 102 communicates through a wireless communication network 104. The wireless network 104 includes antenna, base stations, and supporting radio equipment as for supporting wireless communications between the wireless device 102 and other devices connected to wireless network 104. The wireless network 104 may be coupled to a wireless network gateway and to a wide area network, shown in FIG. 2.

In one embodiment, the wireless device 102 is a two-way communication device having at least voice and/or data communication capabilities, including the capability to communicate with other computer systems. In one embodiment, the wireless device 102 is a handheld device. Depending on the functionality provided by the wireless device 102, it may be referred to as a data messaging device, a two-way pager, a cellular telephone with data messaging capabilities, a wireless Internet appliance, a data communication device (with or without telephony capabilities), or a portable media or music player. The wireless device 102 may communicate with any one of a plurality of fixed transceiver stations within its geographic coverage area.

The wireless device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124. In one embodiment, the antenna elements 118 and 120 may be embedded or internal to the wireless device 102. As will be apparent to those skilled in the field of communications, the particular design of the communication subsystem 112 depends on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access is associated with a subscriber or user of the wireless device 102 via a memory module, such as a memory module 130, which may be a Subscriber Identity Module (SIM) card for use in a GSM network or a USIM card for use in a UMTS. The SIM card is inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems.

The wireless device 102 also includes a battery interface 136 for receiving one or more rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which controls the overall operation of the wireless device 102. Communication functions, including at least data and voice communications, are performed through the communication subsystem 112. The microprocessor 140 also interacts with additional device subsystems such as a display 142, a flash memory 144, a random access memory (RAM) 146, a read-only memory (ROM) 148, auxiliary input/output (I/O) subsystems 150, a Universal Serial Bus (USB) port 152, a keyboard or keypad 154, a speaker or audio port 156 for connecting to, for example a set of headphones, a microphone 158, a clickable thumbwheel, trackball, thumbwheel, or set of scroll buttons 160, a short-range communications subsystem 162, and any other device subsystems generally designated as 164. Some of the subsystems shown in FIG. 1 perform communication-related functions, whereas other subsystems may provide "resident" or on-device functions. Notably, some subsystems, such as the keypad 154, the display 142, and the clickable thumbwheel or trackball 160, for example, may be used for both communication-related functions, such as entering a text message for transmission over the wireless network 104, and executing device-resident functions such as a calculator or task list. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items. One or more memory stores may be available on the wireless device 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards, mini SD cards, micro SD cards, etc.

The PIM and/or media applications have the ability to send and receive data items via either the wireless network 104 or a link to a computer system. The link to the computer system may be via the serial port 152 or the short-range communications subsystem 162. Additional applications may also be loaded onto the wireless device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the display 142 or alternatively to the auxiliary I/O device 150. A user of the wireless device 102 may also compose data items, such as email messages, for example, using the keypad 154 and/or the clickable thumbwheel or trackball 160 in conjunction with the display 142 and possibly the auxiliary I/O device 150. The keypad 154 may be either a complete alphanumeric keypad or telephone-type keypad.

For voice communications, the overall operation of the wireless device 102 is similar, except that the received signals would be output to the speaker or audio port 156 and signals for transmission would be generated by a transducer such as the microphone 158. Alternative voice or audio I/O subsystems, such as a voice message recording subsystem, may also be implemented on the wireless device 102. Although voice or audio signal output is typically accomplished primarily through the speaker or audio port 156, the display 142 may also be used to provide an indication of the identity of a calling party, duration of a voice call, or other voice call related information. Stereo headphones may also be used in place of the speaker 156.

The serial port 152 is normally implemented in a personal digital assistant (PDA) type communication device for which synchronization with a user's computer is a desirable, albeit optional, component. The serial port 152 enables a user to set preferences through an external device or software application and extends the capabilities of the wireless device 102 by providing for information, media file, or software downloads to the wireless device 102 other than through the wireless network 104.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as 802.11b, 802.11g, and/or 802.11n.

Figure 2:
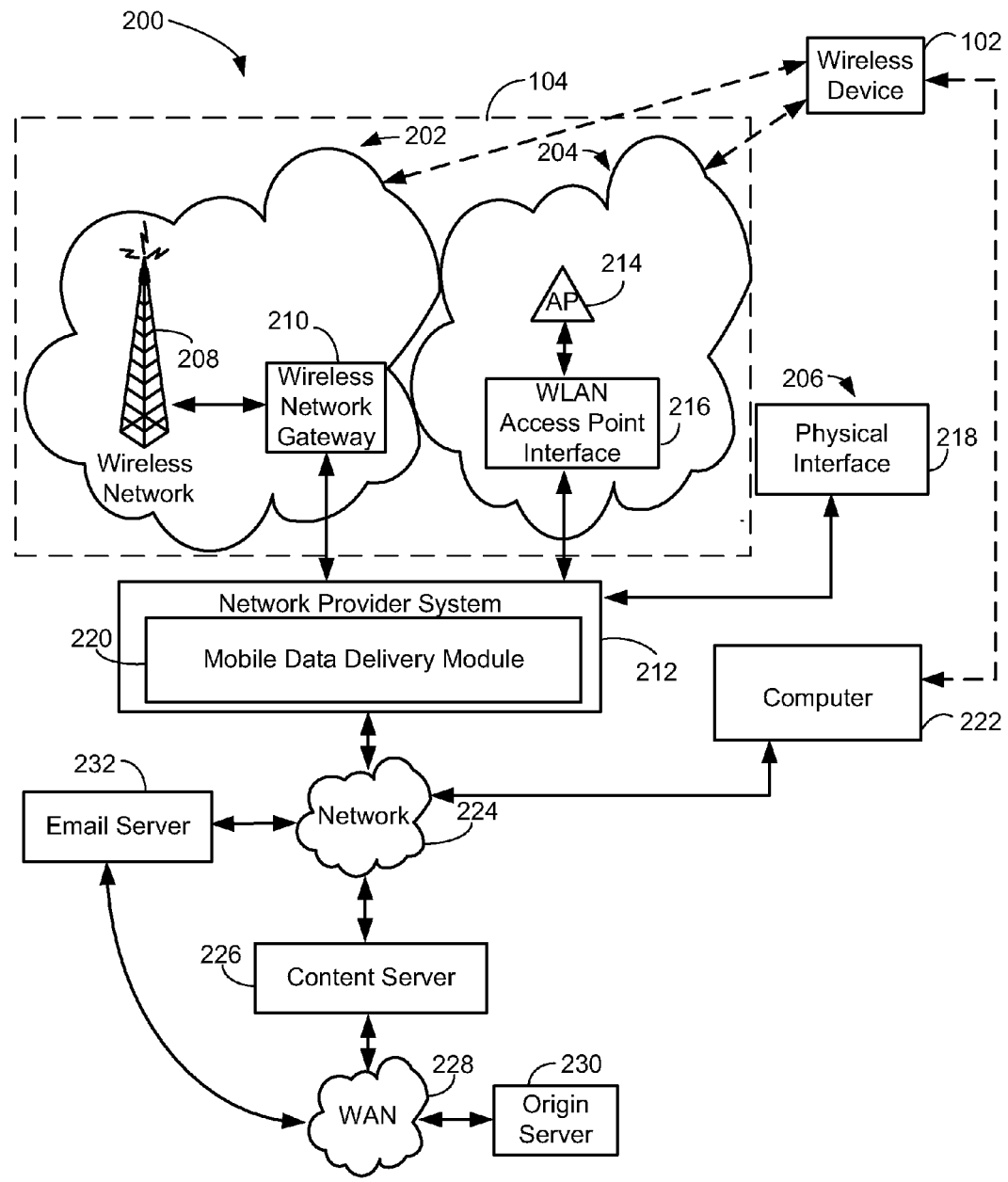
FIG. 2 shows in block diagram form a communication system suitable for providing the operating environment of the wireless device of FIG. 1 in accordance with one embodiment.

Reference is next made to FIG. 2, which shows a communication system 200 suitable for use with the wireless device 102 shown in FIG. 1. The communication system 200 generally includes one or more wireless devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the wireless devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), Third Generation Partnership Project (3GPP or 3G), Evolution-Data Optimized (EV-DO), 3G, or 4G.

As shown in FIG. 2, the communications system 200 also includes a wireless network gateway 210 and one or more network provider systems 212. The wireless network gateway 210 provides translation and routing services between the network provider system(s) 212 and the WAN 202, which facilitates communication between the wireless devices 102 and other devices (not shown) connected, directly or indirectly, to the network provider system 212.

The WLAN 204 comprises a network which in some examples conforms to IEEE 802.11 standards such as 802.11b, 802.11g, and/or 802.11n; however, other communications protocols may also be used for the WLAN 204. The WLAN 204 includes one or more wireless RF Access Points (AP) 214 (one of which is shown in FIG. 2) that collectively provide a WLAN coverage area. For the embodiment depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the wireless devices 102 and other devices (e.g., such as desktop computers) connected, directly or indirectly, to the network provider system 212. The AP interface 216 is implemented using a computer, for example, a server running a suitable computer program or software.

According to one embodiment, the other interfaces 206 may be implemented using a physical interface indicated by reference 218. The physical interface 218 includes an Ethernet, Universal Serial Bus (USB), Firewire, or infrared (IR) connection implemented to exchange information between the network provider system 212 and the wireless device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the wireless devices 102, through either the wireless WAN 202, the WLAN 204, or the other connection 206 to the devices connected, for example, through an enterprise network 224 (e.g., an intranet), to the network provider system 212. In one embodiment, the data delivery module 220 is implemented on a computer, such as the network provider system 212.

The enterprise network 224 comprises a local area network, an intranet, the Internet, a direct connection, or combinations thereof. The enterprise network 224 may comprise an intranet for a corporation or other type of organization. In at least some embodiments, the network provider system 212 is part of the enterprise network 224, and is located behind a corporate firewall and connected to the wireless network gateway 210 through the Internet. A computer 222 (e.g., a desktop or laptop computer) belonging to the user of the wireless device 102 is typically connected to the enterprise network 224. As described earlier, the wireless device 102 may be temporarily and directly connected to the computer 222 using, for example, the serial port 152. This direct connection may make use of a cradle or docking station connected to a serial port of the computer 222, where the mobile device 102 is placed in the cradle, therefore completing the serial connection between the mobile device 102 and the computer 222. Alternatively, the wireless device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some embodiments, an email server 232 and/or the content server 226 form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to one embodiment, the mobile data delivery module 220 provides connectivity between the wireless WAN 202 and the WLAN 204 and the other connection 206 and devices and/or networks connected directly or indirectly to the network provider system 212. In one embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the wireless devices 102.

Figure 3:
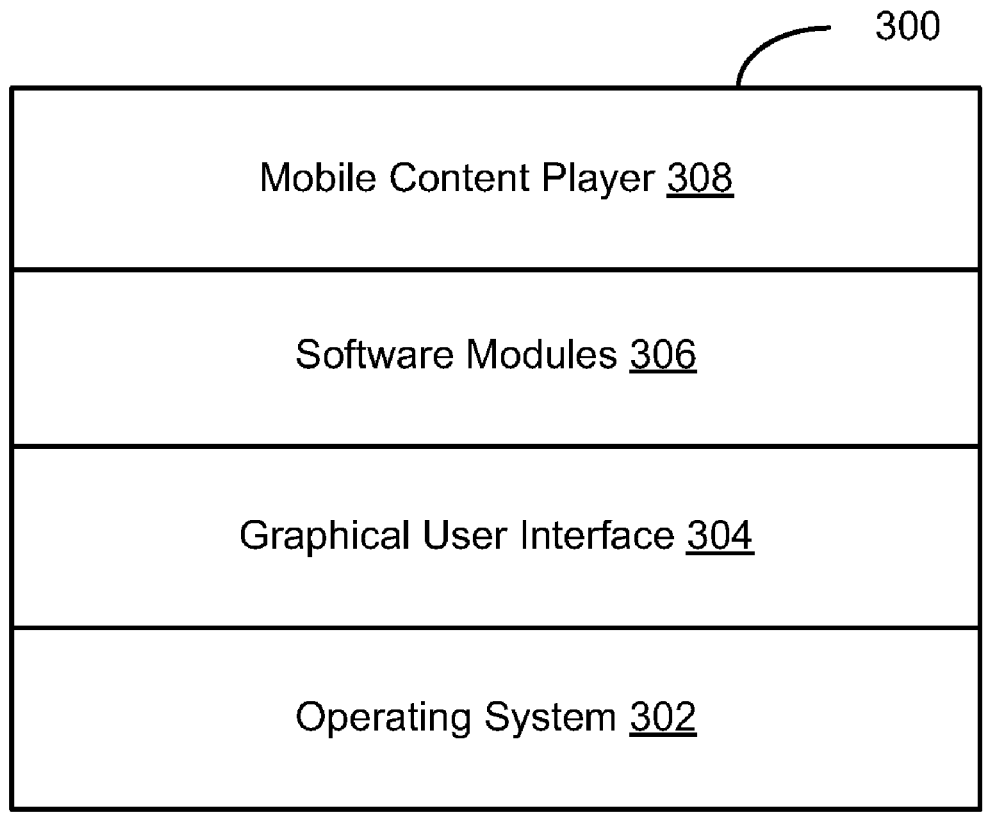
FIG. 3 shows in block diagram form the contents of a memory of the wireless device of FIG. 1.

Reference is next made to FIG. 3, which shows a block diagram illustrating a memory 300 of the wireless device 102. The memory 300 has various software components for controlling the wireless device 102 and may include, for example, the flash memory 144, the RAM 146, the ROM 148, the memory module 130 and/or the other device subsystems 164. In accordance with one embodiment, the wireless device 102 is intended to be a multi-tasking wireless communications device configured for sending and receiving data items and for making and receiving voice calls that also includes various applications enabling users to listen to music, watch video files, play games, view picture files, surf the internet wirelessly, etc. To provide a user-friendly environment to control the operation of the wireless device 102, an operating system (OS) 302 resident on the wireless device 102 provides a basic set of operations for supporting various applications typically operable through a graphical user interface (GUI) 304. For example, the operating system 302 provides basic input/output system features to obtain input from the auxiliary I/O 150, the keypad 154, the clickable thumbwheel or track ball 160, and other input devices, and to facilitate output to the user via the display 142. The GUI 304 is typically a component of the operating system 302. One or more software modules 306 for managing communications or providing a personal digital assistant (PDA) or other functions may also be included. The memory 300 also includes an email and calendar client, which may be combined in, for example, a PIM application having email-based calendaring and scheduling functions. Typically, the PIM is installed as one of the software modules 306.

The memory 300 also includes a mobile content player 308, which may also be referred to as a content delivery module. In one example, the mobile content player 308 may be integrated into the operating system 302. Alternatively, the module 308 may be a separate software component, as illustrated in FIG. 3. The mobile content player 308 may be responsible for managing push content delivery from multiple servers from the perspective of the wireless device 102 and/or playing the push content delivered from the multiple servers. Operation of the mobile content player 308 will be described in more detail below, in connection with FIGS. 5, 6, and 7.

Thus, the wireless device 102 includes computer executable programmed instructions for directing the wireless device 102 to implement various applications. The programmed instructions may be embodied in the one or more software modules 306 resident in the memory 300 of the wireless device 102. Alternatively, the programmed instructions may be tangibly embodied or stored on a computer readable medium (such as a DVD, CD, floppy disk or other storage media) which may be used for transporting the programmed instructions to the memory 300 of the wireless device 102. Alternatively, the programmed instructions may be embedded or carried in a computer-readable, signal-bearing medium that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

Figure 4:
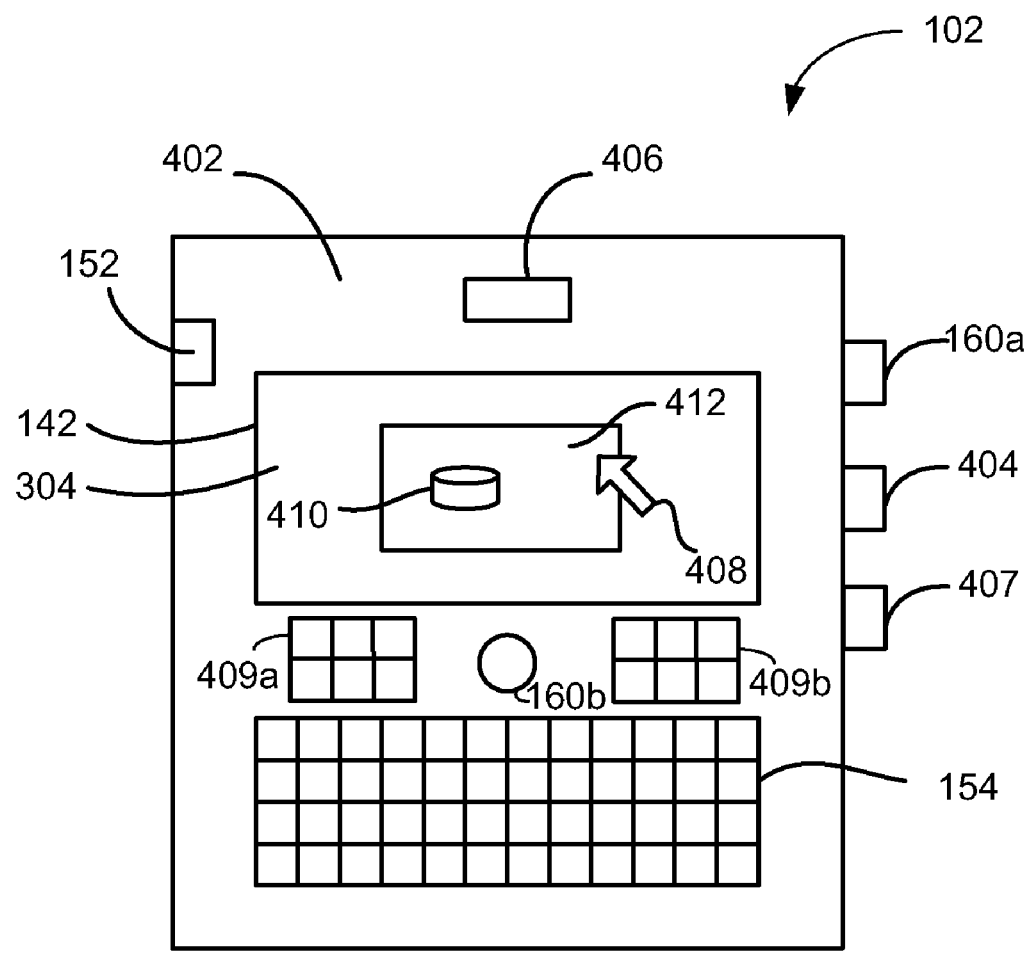
FIG. 4 is a front view illustrating the wireless device of FIG. 1.

Reference is next made to FIG. 4, which shows a front view of the wireless device 102. As mentioned above, the wireless device 102 may be a data and voice-enabled handheld device. The wireless device 102 includes a casing 402, the data or serial port 152, the display screen 142, the graphical user interface (GUI) 304, the keypad 154, the clickable thumbwheel or scroll buttons 160a or other device for navigation such as a trackball 160b, one or more input buttons 404 (e.g., select, cancel, talk, play, stop, fast forward, rewind, next, previous buttons), signal inputs/outputs 406 (e.g., direct wire connection or inductive coupling power connector input, microphone, speaker, data interface input, etc.), and an audio port 407. Additionally, the wireless device 102 may have a number of navigation control buttons represented by numerals 409a and 409b. The navigation control buttons 409 may provide a number of functions such as a send and/or end key for a mobile telephone application of the wireless device 102, a menu key, an escape key, etc. The functions of the navigation control buttons 409 may be user configurable. Internally, the wireless device 102 includes one or more circuit boards (not shown), the microprocessor 140 (FIG. 1), the memory 300 (FIG. 3), the battery 138 (FIG. 1), the antennae 118, 120 (FIG. 1), etc., which may all be coupled to the signal inputs/outputs 406, the keypad 154, the display screen 142, the clickable thumbwheel 160, etc.

The microprocessor 140 is typically coupled to one or more input devices (e.g., the buttons 404, the keypad 154, the clickable thumbwheel 160a, the trackball 160b) for receiving user commands or queries and the display 142 for displaying the results of these commands or queries. For example, user queries may be transformed into a combination of commands for producing one or more tables of output data which may be incorporated in one or more display pages for presentation to the user. The microprocessor 140 is also coupled to the memory 300.

A user may interact with the wireless device 102 and its software modules 306 using the GUI 304. The GUI 304 is controlled by the operating system 302 (FIG. 3) and provides a display format enabling the user to choose commands, execute application programs, manage computer files, and perform other functions by selecting pictorial representations (i.e., icons), or selecting items from a menu through the use of an input or pointing device such as the clickable thumbwheel 160 and/or the keypad 154. Generally, the GUI 304 is used to convey information and receive commands from users and generally includes a variety of GUI objects or controls including icons, toolbars, drop-down menus, pop-up menus, text, dialog boxes, buttons, etc. A user typically interacts with the GUI 304 presented on the display 142 by using an input or pointing device to position a pointer or cursor 408 over an object 410 (i.e., "pointing" at the object) and by "clicking" on the object 410 (e.g., by depressing the thumbwheel 160 or a button on the keyboard 154, etc.). This is often referred to as a point-and-click or selection operation. Typically, the object 410 may be highlighted (e.g., shaded) when it is selected or pointed at by the pointer or cursor 408 to indicate that the object 410 is selectable.

Typically, a GUI-based system presents application, status, and other information to the user in windows appearing on the display 142. A window 412 is a display area shown within the display 142, typically rectangular, in which a user may view an application or document. The window 412 may be open, closed, displayed full screen, reduced to an icon, increased or reduced in size, or moved to different areas of the display 142. Multiple windows 412 may be displayed simultaneously. For example, the windows 412 may be displayed within other windows, overlapped with other windows, or tiled within the display area.

One aspect of the present disclosure provides a method for a mobile content player to receive content from multiple content servers simultaneously. This may provide content providers with the ability to send content to the wireless devices of specifically named users who may opt in to receiving the content. A specific user may also opt out from receiving any further information or content from a specific content provider. This methodology may provide some improvements over the conventional approach. For example, the user may accept invitations from additional content servers beyond the default content server (e.g., the first server that the mobile content player is setup with). Once the user has accepted invitations from additional content servers then those additional servers may also push content to the user's wireless device. This may allow, for example, a bank to push its morning report to any of its clients that have accepted the content server's invitation. This may remove the need for the user to select the content and then pull it to his mobile device, as is traditionally done. The content publisher (e.g., the entity responsible for creating content, such as an organization or institution) may be able to restrict content access to a specific audience, as opposed to a URL link that is normally available to anyone who can access it. The content publisher is distinct from the content authoring and publishing system 506 discussed below in connection with FIG. 5, which may be a server or module running on a server for aiding the content publisher in creating the content and making the content created by the content publisher available to the wireless devices.

The user may be able to easily distinguish when new content has been delivered to his wireless device. The mobile content player may optionally send tracking information on content consumption to the appropriate content server. The tracking may confirm that the user has received the content, launched the content and/or viewed the content. Anti-spamming checks may also be provided as only approved content servers or publishers may send invitations and a user must accept the invitation. If at any time the user decides to remove a content server or publisher, the user may opt out and will no longer have content delivered from that source.

Additionally, the user may opt in to a content server or publisher that the user had previously rejected. The content server may then provide a list of content that would have been sent to the user since the initial invitation, allowing the user to decide if the user wishes to view this missed content.

The term "push" is used herein to refer to a method of content delivery to a wireless device that is automatically delivered by a content server without any action being required on the part of the wireless device user.

Figure 5:
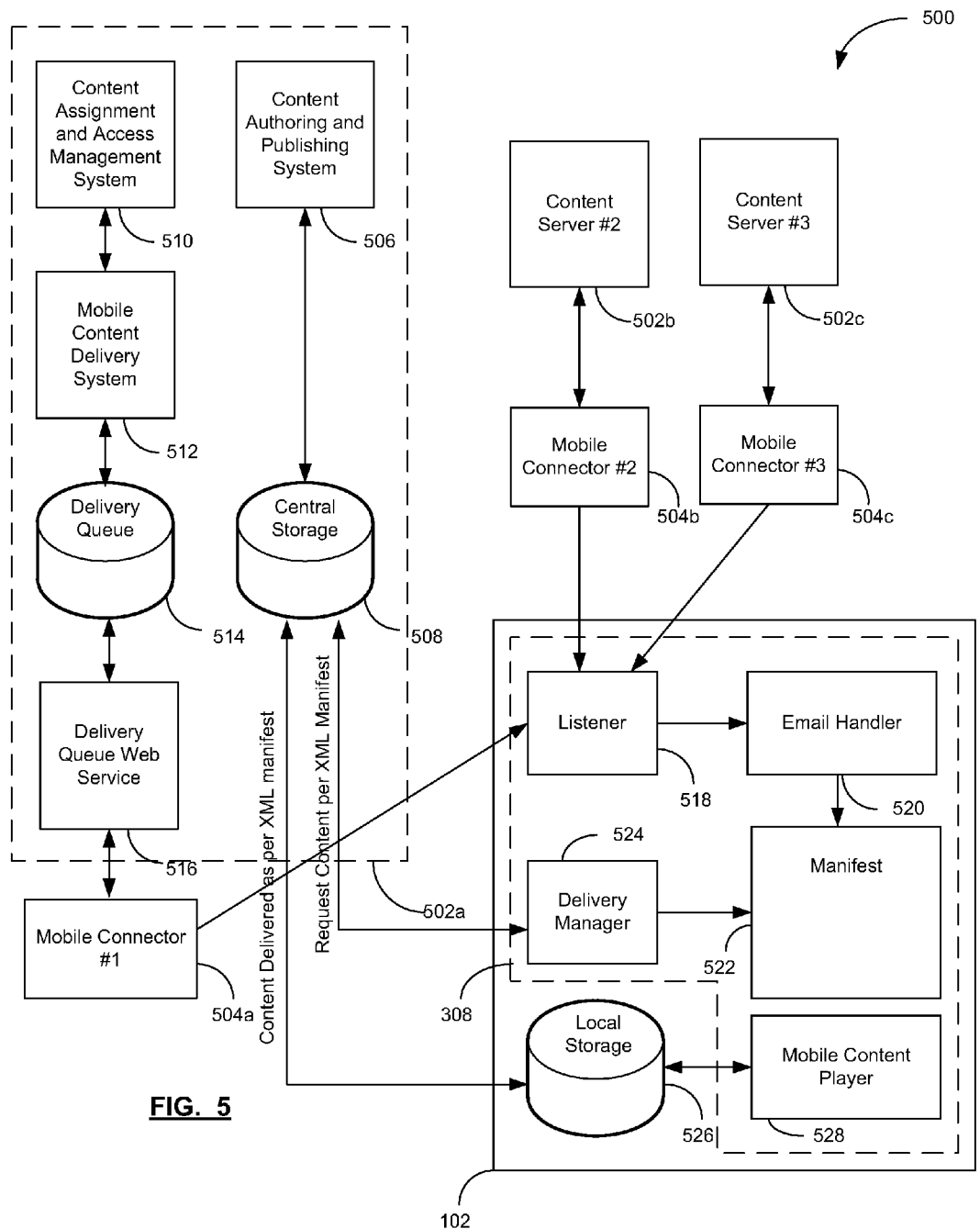
FIG. 5 shows in simplified block diagram form aspects of the communications system of FIG. 2 and the wireless device of FIG. 1 configured to deliver push content to the wireless device using multiple content servers in accordance with one embodiment.
Figure 6:
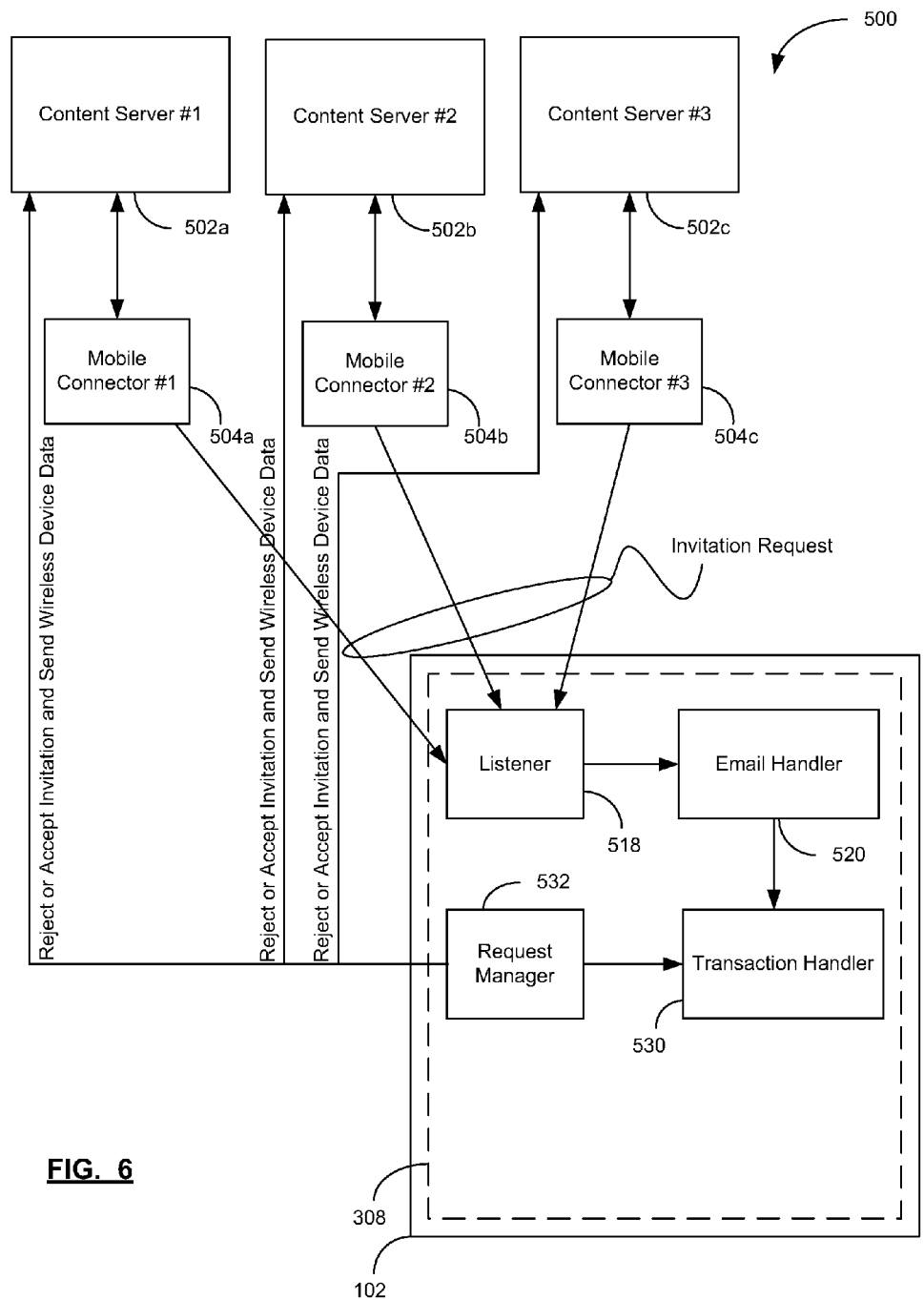
FIG. 6 shows in simplified block diagram form an invitation interaction between the wireless device and content servers shown in FIG. 5 in accordance with one embodiment.

Reference is next made to FIGS. 5 and 6. FIG. 5 shows in simplified block diagram form the communications system of FIG. 2 and the wireless device of FIG. 1 configured to deliver push content to the wireless device using multiple content servers in accordance with one embodiment. The system shown in FIG. 5 is referred to collectively as the system 500. Reference is also made to FIG. 6 which shows in simplified block diagram form an invitation interaction between the wireless device and content servers shown in FIG. 5 in accordance with one embodiment.

The system 500 generally includes a number of content servers 502, individually referred to as 502a, 502b, 502c, a number of mobile connectors 504, individually referred to as 504a, 504b, 504c, and one or more wireless devices 102, only one of which is shown in FIGS. 5 and 6. The content servers 502 may, for example, be implemented by the content server 226 shown in FIG. 2 and the mobile connectors 504 may be implemented, for example, by the network provider system 220. FIG. 5 shows a detailed view of content server 502a and simplified views of content servers 502b and 502c. Regardless, content servers 502b and 502c may be similarly configured as content server 502a.

The content server 502 generally comprises a content authoring and publishing system 506, a central storage 508, a content assignment and access management system 510, a mobile content delivery system 512, a delivery queue 514, and a delivery queue web service 516.

The content authoring and publishing system 506 may be implemented using a number of systems in the market today, which provide for creation and central storage of content formatted for wireless devices. Alternatively, the content authoring and publishing system 506 may be implemented using solutions yet to be developed. The authoring may be accomplished by an appropriate application and then saved to a central server, such as the central storage 508, for access by the wireless devices 102. Once content has been created, the content may be stored in the central content storage 508 for later access. For example, an audio clip may be authored in an audio editing tool, saved, and then published to a central content server or central storage 508. In one example, another system 506 may manage access to this content.

Once the content has been created, the content may be assigned to users for consumption. This assignment may function as a trigger for the delivery to occur. In one example, the content assignment and access management system 510 may make a request to the mobile content delivery system 512 to send all the content directly to the user's wireless device 102 after the user has accepted the invitation to add the content server 502. This request may contain information identifying what type the content is (e.g., a mobile learning course) and target user information so the delivery can be directed to specific wireless devices 102 belonging to specific individual users. The request may also contain information that the content server 502 uses to find all elements of the content to be delivered. The content assignment may not need any knowledge of the mobile transport platform being used, which may be configured in the mobile connector system 504 and may be tied to a user's wireless device 102 type.

If the content publisher wishes to send an invitation to a specific user to opt in to the content server 502 then the invitation to that user may be created by the content assignment and access management system 510. This invitation may be created and sent to the mobile content delivery system 512 for delivery to the wireless device 102 of the selected user.

The mobile content delivery system 512 may receive requests for delivering content. These requests may originate from a system component that is assigning the content to users, such as the content authoring and publishing system 506 and/or the content assignment and access management system 510. When these requests are received, the mobile content delivery system 512 may look up the target and determine if the user has a wireless device 102 and if that device has a transport defined. The request may be verified to be in the proper format and then processed. If the user does not have a wireless device 102 or a transport has not been defined, then the appropriate response is returned to the requesting system. Every user may register with the mobile content delivery system 512 to ensure the deliveries can take place. Once this information is gathered, the mobile content delivery system 512 may place the request onto the delivery queue 514 with a status indicated as "new". In one example, the request may be an XML request.

Each XML request may be populated with a company identifier that determines which company is authorized to view the XML request on the delivery queue 514. Modifications to the content may occur after the content has been delivered. It may be left to the calling application to send a new delivery request for the content if it has changed.

The delivery queue web service 516 may listen for requests made by the mobile connector 504. These requests may determine if there are items on the queue 514 that the mobile connector 504 is able to extract and deliver.

The mobile connector 504 may poll the delivery queue web service 516 in predefined intervals to see if there is any content available that needs to be delivered. Each of the mobile connectors 504 may be configured for a specific content server or publisher. The mobile connectors 504 may issue a web services call to the delivery queue web service 516. This call may contain user credentials that the web service 516 authenticates to determine what queue items the mobile connector 504 is authorized to see. If there are no items authorized, the mobile connector 504 may wait for a predefined time interval to elapse and try again. If the mobile connector 504 does find an item on the queue, the mobile connector 504 may retrieve the queued item as, for example an XML document that describes the content. The mobile connector 504 may only process one queued item at a time, but may alternatively be configured to process multiple items at a time.

When the mobile connector 504 receives an XML transaction from the web service 516, the mobile connector 504 looks up the intended transport for the wireless device 102 type and delivers to the wireless device 102. The mobile connector 504 may further return result codes back to the delivery queue web service 516 based on the ability of the mobile connector 504 to successfully send the delivery request to the wireless device 102 infrastructure.

The mobile connector 504 may work simultaneously with several mobile platforms or transport types. This may include any transport that allows a real-time delivery of content to the wireless device 102, or any mechanism that publishes the content directly to the wireless devices 102 wirelessly.

The wireless device 102 memory 300 generally includes a number of components related to the mobile content player 308. The components that relate to the mobile content player 308 include a listener 518, an email handler 520, a manifest 522, a delivery manager 524, a mobile content player 528, a transaction handler 530 (FIG. 6), and a request manager 532 (FIG. 6). The memory 300 also includes at least one area used for local storage, indicated by local storage 526. The manifest 522 is received and stored in the memory 300 for use by the content player 308, but may be a working data store as opposed to an application component.

One aspect of the present application may make use of caching servers for content delivery to the wireless devices 102. When a delivery occurs, the content may be retrieved from a local caching server instead of the centralized content server 502. The mobile content player 308 may be programmed to render various content types. The mobile content player 308 may accept the delivery of content from the mobile content delivery system 512 through the content server 502. The mobile content player 308 may also accept, for example, notifications when a new course has been delivered to the wireless device 102, which may be in addition to the wireless device 102 receiving an email. There may be configurable notification options on the mobile content delivery system 512.

The delivery manager 524 may process a manifest file (e.g., the manifest 522) by retrieving each item specified by URL in the manifest file 522 from the central content storage 508. These items may be placed in the wireless device local device storage 526. Once content is delivered to the wireless device 102, the content remains in the local storage 526 for the mobile content player 528 to render it. The delivered content may be removed from either the player 308 or from the mobile content delivery system 512. If the player 528 attempts to render content that has been removed from the local storage 526, then the player 308 may automatically attempt to retrieve the content from the content server 502.

The listener 518 may listen for the request sent from the mobile connector 504. The listener 518 may receive the XML manifest 522 and extract each content URL from the XML manifest 522. The listener 518 may then send that URL to the delivery manager 524 for content retrieval using the content URLs.

If a request is received via e-mail, the wireless device 102 processes the e-mail through the email handler 520. The email handler 520 decrypts the contents of the email, if encrypted, that contain the instructions for retrieving the content manifest, reads the e-mail information into memory, and then deletes the e-mail from the user's wireless device 102 email inbox. The email handler 520 may also authenticate the email by checking to see that the destination email address, which in one example may be contained in an encrypted header of the email, matches the email address of the wireless device 102 on which the email handler 520 is installed. The email handler 520 uses the information stored in memory to make an HTTP request to the content authoring and publishing system 506 requesting the content manifest. When the content authoring and publishing system 506 determines that a user's e-mail is valid (e.g., the system 506 may also authenticate the originating email address of the wireless device 102, which may be contained in an encrypted header), the system 506 sends the manifest to the mobile device 102 through its HTTP response, and the manifest is saved as the manifest 522. Alternatively, the system 506 may also authenticate a PIN received from the wireless device 102. The email authentication performed by the email handler 520 and/or the content provider 502 as described above may function to ensure that only authorized recipients are receiving content. In one example, if a user of the wireless device 102 forwarded an email originating from the content server 502 to another user, the other user would not be able to retrieve content from the content provider 502.

If an invitation from a new content server 502 is received via an email at the listener 518, as indicated by the invitation request arrows shown in FIG. 6, the email handler 520 decrypts the contents of the e-mail that contains the information for that content server 502. The email handler 520 may send the information to the transaction handler 530.

When the transaction handler 530 receives information from the email handler 520 that contains data about a new content server 502 (e.g., publisher invitations), the transaction handler 530 may determine if there is an upgrade to the mobile content player 308 version needed to communicate with that content server 502. The transaction handler 530 notifies the user of the invitation received from the new content server 502 and awaits acceptance or rejection by the user. The transaction handler 530 may also notify the user if a version upgrade of the content player 308 is needed or recommended for playing content from the content server 502. In one example, version upgrades may be indicated as being needed if the current version of the content player 308 installed on the wireless device 102 is not compatible with the content to be received from the new content server 502. Version upgrades may be recommended if the current version of the content player 308 is compatible with the content to be received from the new content server, but additional features may be available if the content player 308 is upgraded. Once the request has been accepted or rejected, the information is sent to the request manager 532 to relay to the requesting content server 502, as indicated by the arrows shown in FIG. 6 labelled as rejecting or accepting the invitation and sending wireless device data to the content server 502.

The request manager 532 processes the user response for a new content server 502 that has sent an invitation to the wireless device 102 to add that server 502. This acceptance or rejection information is received at the request manager 532 from the transaction handler 530.

While the content servers 502 and mobile connectors 504 are represented as distinct components and have a number of sub-components, any of these components or subcomponents may be implemented as modules running on a number of interconnected servers or on a single server, depending on the design criteria of a particular application. For example, any of the components 502, 504, 506, 508, 510, 512, 514, and 516 may be implemented on any of the network provider system 212, the network 224, the content server 226, the email server 232, or the origin server 230. Alternatively, in one example, the components 502, 504, 506, 508, 510, 512, 514, and 516 may be implemented on a single one of the network provider system 212, the network 224, the content server 226, the email server 232, or the origin server 230. Additionally, while three content servers 502 and three mobile connectors 504 are shown as an example in FIGS. 5 and 6, the present description is intended to include any number of content servers (e.g., two or more) operating to provide push content to the wireless devices 102.

Reference is next made to FIG. 7, which shows in flowchart form a method 700 for an invitation interaction introduced in FIG. 6 in accordance with one aspect of the present disclosure. In other words, the method 700 illustrates an example of adding a content server 502 as a content source for the wireless device 102 in a push content delivery system 500 having a plurality of content servers 502 configurable for delivering push content to the wireless device 102.

In a first block 702, a content server such as any one of the content servers 502 sends an invitation to a particular wireless device 102 through the respective mobile connector 504. The invitation may be received by several wireless devices based on criteria set by the publisher or owner of the particular content server 502, examples of which were described above. At the block 702, the content server 502 may make a record that an invitation to a particular wireless device 102 is "pending". Next, at a block 704, the wireless device 102 receives the invitation from the content server 502, for example wirelessly at the listener 518 and/or the email handler 520. If the content player 308 is not currently installed on the wireless device 102, the invitation may appear simply as an email in the user's inbox.

Next a macro-block 705, a determination is made if the mobile content player 308 is to be installed on the wireless device 102 receiving the invitation. The macro-block 705 includes a number of sub-blocks.

At a block 706, the wireless device 102 may perform a check to see if the content player 308 needed to receive and view content from the particular content server 502 that sent the invitation is installed on the wireless device 102. If the player 308 is not installed on the wireless device 102, a notification is provided to the user of the wireless device 102 at a block 708 in the form of an email appearing in the user's inbox indicating that a content server has sent an invitation and that the content player 308 (e.g., and components 518, 520, 524, 528, 530, 532) must be installed. A URL may appear in the email, allowing the user to download and install the content player 308. Optionally, the email arrival may be combined with a notification that is displayed on the display 142 of the wireless device 102 or an audible notification may be provided through the speaker or audio port 156 indicating that the content player 308 is available for installation on the wireless device 102 and/or that an invitation has arrived from the content server 502 and the content server 502 needs the content player 308 to be installed if the invitation is to be accepted. Response from the user of the wireless device 102 is evaluated at a block 710 (e.g., by receiving a selection by the user using the keypad 154 and/or the trackball 160 to travel to the URL link and download the content player 308) and if the user chooses not to install the content player 308 by not travelling to the URL, at a block 712 the content server 502 may leave the status of the sent invitation to the wireless device 102 as "pending" indefinitely and the content server 502 may be configured not to send any further invitations to the particular wireless device 102 since the user has elected not to be able to view content from the content server 502 by not downloading the content player 308. The method 700 then ends at a block 714. Alternatively, if the user chose at the block 710 to travel to the URL presented in the email therefore accepting installation of the content player 308, the wireless device 102 may retrieve the content player 308 and components 518, 520, 524, 528, 530, and/or 532 and install the content player 308 on the local storage device 526 (e.g., in the memory 300), and set the content server 502 that sent the invitation and delivered the content player 308 as the default content server 502, since that particular content server is the first to use the content player 308. When the URL for the content player 308 is selected and the content player 308 is downloaded, the content server 502 may update the status of the sent invitation to the wireless device 102 as "accepted". The device 102 may also provide wireless device 102 data to the content server 502 with its acceptance response. The method 700 then ends at the block 714.

If it was determined at the block 706 that the content player 308 was already installed, a check is performed at a block 718 to determine if the installed content player 308 is compatible with the version being offered by the content server 502. If the version of the content player 308 is compatible with the version being offered by the content server 502 (e.g., the installed content player 308 is capable of rendering content from the content server 502), a notification of the invitation is provided to the user of the wireless device 102 at a block 722. In one example, the notification may be directed by the transaction handler 530, since the transaction handler is already installed. For example, a notification may be displayed on the display 142 of the wireless device 102 or an audible notification may be provided through the speaker or audio port 156 indicating that the invitation has been received from the content server 502 to receive new push content on the wireless device 102.

If the version of the content player 308 is not compatible with the version being offered by the content server 502, a notification of the invitation and/or content player 308 version upgrade is provided to the user of the wireless device 102 at a block 720, which may be directed by the existing version of the transaction handler 530. For example, a notification may be displayed on the display 142 of the wireless device 102 or an audible notification may be provided through the speaker or audio port 156 indicating that the invitation has been received from the content server 502 to receive new push content on the wireless device 102 and/or that a version upgrade for the content player 308 is needed. Alternatively, the notification may state that the current version of the content player 308 installed on the wireless device 102 is compatible with the content to be received from the content server 502, but that a version upgrade is recommended if push the content invitation is to be accepted so that all features will be available in the content to be delivered.

Next, at a block 724, it is determined if the invitation has been accepted by the user. If the user did not accept the invitation, the content server 502 is notified of the rejection at a block 726 and the content server 502 logs the rejection at a block 728. In one example, the content server 502 may be configured not to send further content to the wireless device 102 unless an acceptance is received at a future point in time. The method 700 then ends at the block 714.

If the user had accepted the invitation at the block 724, the request manager 532 provides the content server 502 with further data about the wireless device 102 at a block 730. The further data may include information about the wireless device needed for the content server to provide suitable push content to the wireless device 102 in the future, or any other data that may be used by the content server 502, such as data about the wireless device 102 and/or its user.

Next, at a block 732, it is determined if content player 308 version is compatible with the version being offered by the content server 502. If the version is compatible, the method 700 ends at the block 714. If the version is not compatible (e.g., either an upgrade is needed or an upgrade is recommended and the user chose to perform the recommended upgrade), the wireless device 102 retrieves the content player 308 at the block 734, installs the updated content player 308 in the local storage 526, and the method 700 ends at the block 714.

The subject matter described above may be used by the mobile content player 308 to receive mobile content from multiple content servers 502. This may allow multiple content publishers, where a content publisher typically represents a single content server but is not limited to a single content server, to deliver content to a single mobile content player 308 in a push fashion. This may allow any application that requires content (e.g., media, text, audio, video, etc.) to be targeted to a specific user or user population by a content publisher. The process is made easier if the content provider pushes content automatically over the air to the wireless device 102 with no user intervention required. Examples of possible applications of this include: (a) training systems where courses are delivered to wireless device users and groups from multiple content publishers; for training systems the content publishers may be from a compliance content provider, internal company training material, external content publisher, etc.; (b) news readers through RSS feeds delivered from multiple content publishers; (c) receiving video and audio files from multiple content publishers, such as any news site; (d) receiving applications and data files at the wireless device from multiple content publishers; (e) expansion of podcasting functionality to enable podcast subscriptions via multiple content publishers; and (f) a registry of content publishers to allow a user to search for a content publisher to request a subscription from a particular content publisher.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A wireless device comprising:
 a processor for controlling operation of the wireless device;
 a first input device coupled to the processor for accepting an input;
 at least one display device coupled to the processor for communicating an output to the user;

a communications subsystem coupled to the processor for communicating with a communications network, the communications network including a plurality of content servers configurable for delivering push content to the wireless device;

a memory coupled to the processor; and a storage device coupled to the processor;

the wireless device including one or more modules for adding one of the plurality of content servers as a content source for the wireless device in a push content delivery system, the one or more modules being configured to cause the wireless device to:

receive an invitation from a given content server of the plurality of content servers;

upon receipt of the invitation and prior to providing a first notification of the invitation, determining if a mobile content player for displaying content identified in the invitation is installed in the storage device;

provide a second notification that the mobile content player is to be installed when it is determined that the mobile content player is to be installed;

provide the first notification of the invitation from the given content server when it is determined that the mobile content player is not to be installed;

determine if the invitation is accepted;

send data to the content server if the invitation is accepted, the data for configuring the content server to push content to the wireless device; and retrieve and install the mobile content player in the storage device if the mobile content player is to be installed.

2. The wireless device according to claim 1, wherein the determining if a mobile content player is to be installed in the storage device further comprises:

determining if the mobile content player is already installed in the storage device;

providing the second notification on the display device of the invitation and mobile content player availability if the mobile content player is not installed, the second notification being in the form of an electronic mail communication appearing on the display of the wireless device; and providing a prompt for a selection as to whether or not the mobile content player is to be installed.

3. The wireless device according to claim 2, wherein the electronic mail communication includes at least one of an electronic mail message (email), an SMS message, and an MMS message, and the providing of a prompt for a selection as to whether or not the mobile content player is to be installed includes providing in the electronic mail communication a Uniform Resource Locator (URL) for retrieving the mobile content player.

4. The wireless device according to claim 3, wherein selection of the URL for retrieving the mobile content player operates as both an acceptance of installation of the mobile content player and an acceptance of the invitation from the given content server.

5. The wireless device according to claim 1, wherein the determining if a mobile content player is to be installed in the storage device further comprises:

determining if the mobile content player is already installed in the storage device;

determining if a version of the mobile content player installed in the storage device is compatible with a version being offering by the content server if the mobile content player is already installed in the storage device;

providing the second notification that the version of the mobile content player installed in the storage device is not compatible with the version being offered by the content server if the version of the mobile content player installed in the storage device is not compatible the version being offered by the content server;

and providing the first notification of the invitation received from the content server on the display device.

6. The wireless device according to claim 1, wherein the determining if the invitation is accepted comprises providing the first notification of the invitation on the display device and receiving a selection from the first input device as to whether or not the invitation is accepted.

7. The wireless device according to claim 1, wherein the wireless device is configured to receive push content from the plurality of content servers with no input needed from a user after the invitations are accepted for each of the plurality of content servers and after the mobile content player is installed on the wireless device.

8. The wireless device according to claim 1, wherein the one or more modules include at least one of a listener, an email handler, a transaction handler, a request manager, a content player, and a delivery manager.

9. A method in a wireless device for adding a content server as a content source for the wireless device in a push content delivery system having a plurality of content servers configurable for delivering push content to the wireless device, the method comprising:

receiving an invitation from the content server at the wireless device;

upon receipt of the invitation and prior to providing a first notification of the invitation, determining if a mobile content player for displaying content identified in the invitation is installed in the storage device;

providing a second notification that the mobile content player is to be installed when it is determined that the mobile content player is to be installed;

providing the first notification of the invitation from the given content server when it is determined that the mobile content player is not to be installed;

determining if the invitation is accepted;

sending wireless device data to the content server from the wireless device if the invitation is accepted, the wireless device data for configuring the content server to push content to the wireless device; and retrieving and installing the mobile content player on the wireless device if the mobile content player is to be installed.

10. The method according to claim 9, wherein the determining if a mobile content player is to be installed on the wireless device further comprises:

determining if the mobile content player is already installed on the wireless device;

providing the second notification of the invitation and mobile content player availability if the mobile content player is not installed, the second notification being in the form of an electronic mail communication appearing on the display of the wireless device; and providing a prompt for selection as to whether or not the mobile content player is to be installed.

11. The method according to claim 10, wherein the electronic mail communication includes at least one of an electronic mail message (email), an SMS message, and an MMS message, and the providing of a prompt for a selection as to whether or not the mobile content player is to be installed includes providing in the electronic mail communication a Uniform Resource Locator (URL) for retrieving the mobile content player.

12. The method according to claim 11, wherein selection of the URL for retrieving the mobile content player operates as both an acceptance of installation of the mobile content player and acceptance of the invitation from the content server.

13. The method according to claim 9, wherein the determining if a mobile content player is to be installed on the wireless device further comprises:
- determining if the mobile content player is already installed on the wireless device;
- determining if a version of the mobile content player installed on the wireless device is compatible with a version being offering by the content server if the mobile content player is already installed on the wireless device;
- providing the second notification that the version of the mobile content player installed on the wireless device is not compatible with the version being offered by the content server if the version of the mobile content player installed on the wireless device is not compatible with the version being offered by the content server; and
- providing the first notification of the invitation received from the content server.

14. The method according to claim 9, wherein the determining if the invitation is accepted comprises providing the first notification of the invitation and receiving a selection as to whether or not the invitation is accepted.

15. The method according to claim 9, wherein upon completion of the method, the wireless device is configured to receive push content from the plurality of content servers with no input needed from a user after the invitations are accepted for each of the plurality of content servers.

* * * * *